(12) United States Patent
Amano et al.

(10) Patent No.: US 8,873,631 B2
(45) Date of Patent: Oct. 28, 2014

(54) VIDEO DECODING DEVICE, VIDEO DECODING METHOD, VIDEO DECODING PROGRAM, AND VIDEO DECODING INTEGRATED CIRCUIT

(71) Applicant: Panasonic Corporation, Osaka (JP)

(72) Inventors: Hiroshi Amano, Osaka (JP); Takeshi Tanaka, Osaka (JP); Kouji Nakajima, Kyoto (JP); Eiji Otomura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/888,712

(22) Filed: May 7, 2013

(65) Prior Publication Data
US 2013/0243096 A1 Sep. 19, 2013

Related U.S. Application Data

(62) Division of application No. 11/393,426, filed on Mar. 30, 2006.

(30) Foreign Application Priority Data

Mar. 31, 2005 (JP) .................................. 2005-102158

(51) Int. Cl.
- H04N 7/12 (2006.01)
- H04N 19/61 (2014.01)
- H04N 19/51 (2014.01)
- H04N 19/583 (2014.01)
- H04N 19/44 (2014.01)

(52) U.S. Cl.
CPC ... *H04N 19/00733* (2013.01); *H04N 19/00781* (2013.01); *H04N 19/00684* (2013.01); *H04N 19/00533* (2013.01)
USPC .................................. 375/240.15; 375/240.16

(58) Field of Classification Search
CPC ........................................................ G06F 3/14
USPC .......................... 375/240.15, 240.16, 240.23
See application file for complete search history.

(56) References Cited

U.S. PATENT DOCUMENTS

| 6,825,885 | B2 | 11/2004 | Bottreau et al. |
| 7,362,808 | B2 | 4/2008 | Kang |

(Continued)

FOREIGN PATENT DOCUMENTS

| EP | 0 689 359 | 12/1995 |
| JP | 2004-007337 | 1/2004 |

OTHER PUBLICATIONS

Revised Text for ITU-T Recommendation H.262 / ISO/IEC 13818-2: 1995, Information technology—Generic coding moving pictures and associated audio information: Video, ISO/IEC JTC 1/SC 29 N 0981 Rev, Mar. 31, 1995.

(Continued)

*Primary Examiner* — Anner Holder

(57) ABSTRACT

With use of a simplified program or calculating device for motion compensation, a video decoding device decodes video data compressed by motion detection operations on macroblock units, as in the MPEG-4 AVC standard. The video decoding device splits compressed data blocks of the prescribed size, 16×16 pixels for instance, to generate sub-blocks, which are smaller than the blocks and on which the video decoding device is able to execute motion compensation operations. The video decoding device duplicates a motion vector assigned to a given block to generate as many motion vectors as there are sub-blocks in the given block, and executes motion compensation on each sub-block using the corresponding duplicate motion vector. Data resulting from the motion compensation operation on each sub-block is combined to obtain a target block corresponding to the given block.

8 Claims, 15 Drawing Sheets

(56) References Cited

U.S. PATENT DOCUMENTS

| | | |
|---|---|---|
| 7,555,043 B2 | 6/2009 | Sato et al. |
| 7,643,559 B2 | 1/2010 | Kato et al. |
| 2003/0174776 A1 | 9/2003 | Shimizu et al. |
| 2005/0207496 A1* | 9/2005 | Komiya et al. .......... 375/240.16 |
| 2005/0254581 A1* | 11/2005 | Iguchi et al. ............ 375/240.12 |
| 2006/0239354 A1 | 10/2006 | Amano et al. |

OTHER PUBLICATIONS

Draft of Version 4 of H.264/AVC (ITU-T Recommendation H.264 and ISO/IEC 1449640 (MPEG-4 part 10) Advanced Video Coding), 14th Meeting, Hong Kong, Jan. 2005.

* cited by examiner

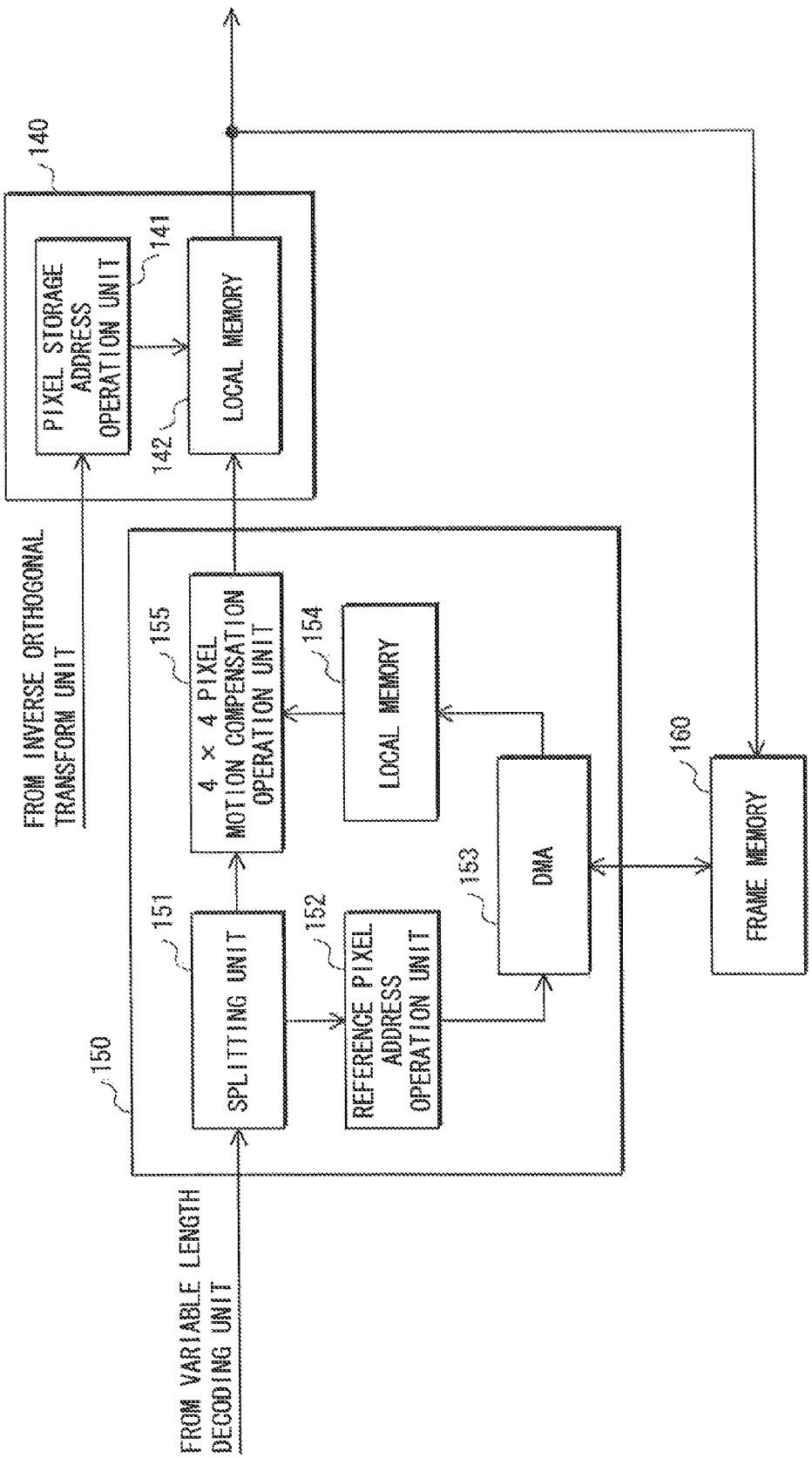

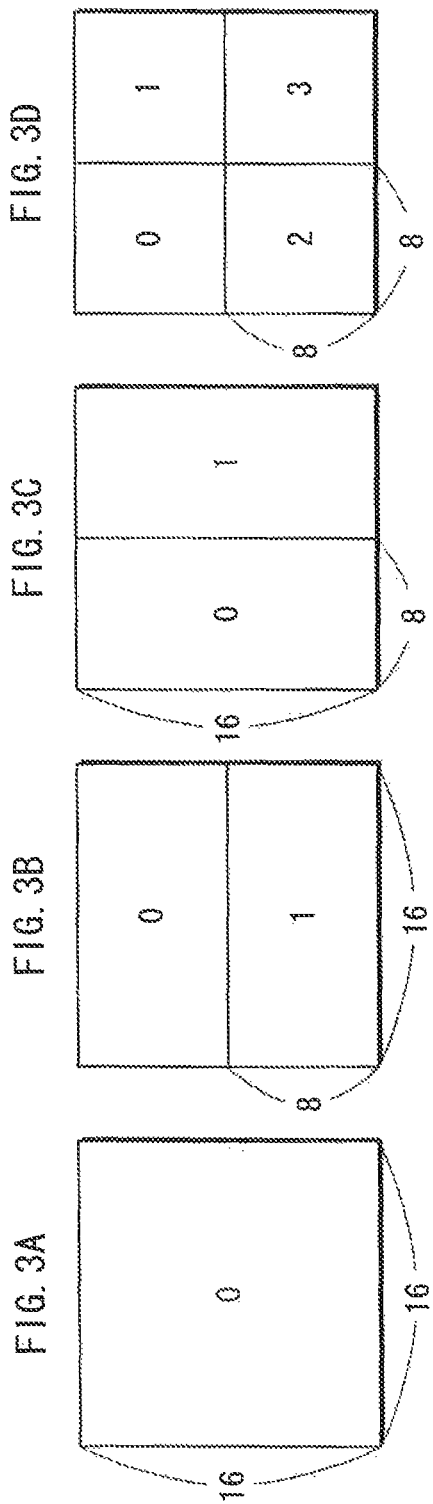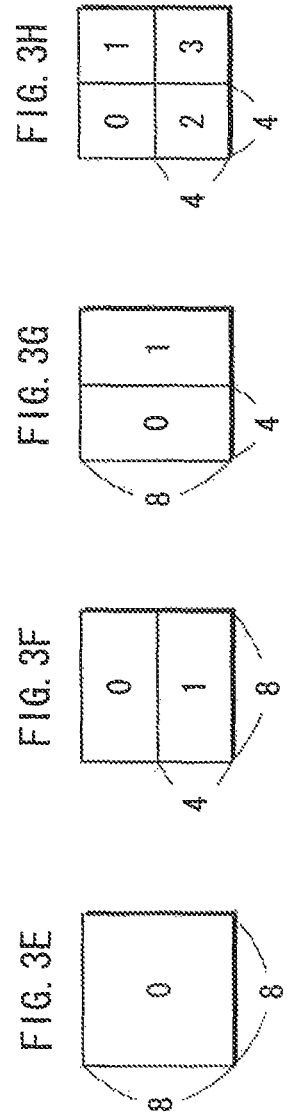

VIDEO DECODING DEVICE, VIDEO DECODING METHOD, VIDEO DECODING PROGRAM, AND VIDEO DECODING INTEGRATED CIRCUIT

RELATED APPLICATION

This is a divisional application of U.S. patent application Ser. No. 11/393,426 filed on Mar. 30, 2006 which claims priority from Japanese Application No. 2005-102158 filed on Mar. 31, 2005 in Japan.

BACKGROUND OF THE INVENTION (1) Field of the Invention

The present invention relates to a technology for decoding compressed video data.

(2) Description of the Related Art

In recent years, progress has been made in the digitization of moving picture data. It has become common practice to compress moving picture data in order to shorten transmission times and avoid overwhelming transmission bandwidths when the moving picture data is transmitted in large quantities or recorded on recording media. Compression is often carried out using compression techniques which comply with standards such as MPEG (Moving Pictures Experts Group) 2 and MPEG-4AVC. See "ISO/IEC (International Organization for Standardization/International Electro-technical Commission) 13818-2" for details of the MPEG 2 standard, and "ITU-T (International Telecommunications Union-Telecommunications standardization sector) H.264 for details of the MPEG-4AVC standard.

The moving picture data encoding methods of the MPEG standards make use of a technique known as motion detection to compress the moving picture data.

The compressed moving picture data is then decoded by performing processing known as motion compensation processing, which is the inverse process of the motion detection. Simply stated, motion detection is a method for efficiently compressing video data by detecting the movement of objects in consecutive frames. In motion detection, a motion vector indicating how far and in what direction a macroblock has moved between a frame to be encoded and a reference frame is calculated for each of a plurality of macroblocks (e.g. 16×16 pixel macroblocks). The motion vector and difference data between the macroblock of the reference frame and the macroblock of the frame to be encoded are calculated. In decoding, the motion vector and the difference data are used in the motion compensation processing to reproduce the macroblock in the target frame. Since the difference data has a data size substantially smaller than the original pixel data, a high level of compression is possible. Reducing the data size in this way enables a considerable improvement in the speed of data transmission in comparison to when the video data is not compressed.

In the MPEG-4AVC standard the sizes of the macroblocks are 16×16 pixels, 8×16 pixels, 16×8 pixels, and 8×8 pixels. The 8×8 pixel macroblock may be divided into sub-macroblocks of 8×4 pixels, 4×8 pixels and 4×4 pixels. Sub-macroblocks of 8×8 pixels are a further possibility.

In a software implementation of a single device supporting the plurality of macroblock types, a different program must be written for each sub-macroblock and macroblock size. To produce the video decoding device therefore requires the time and effort to write seven different programs. Moreover, the video decoding device has to store these programs in memory, which undesirably consumes memory capacity.

In a hardware implementation of the device supporting the plurality of macroblock types, on the other hand, calculating devices must be provided for each macroblock and sub-macroblock size. This may lead to increases in cost and required installation space.

SUMMARY OF THE INVENTION

In view of these problems, an object of the present invention is to provide a video decoding device which is smaller or requires fewer design man-hours and less memory capacity.

In order to solve this problem, the present invention is a video decoding device for decoding encoded video data including motion vectors that correspond uniquely to rectangular blocks in each of a plurality of frames, by performing a series of motion compensation operations using the motion vectors, the video decoding device including: a splitting unit operable to split a block of a source frame into a plurality of rectangular sub-blocks of a prescribed size, and calculate position coordinates for each sub-block; a specifying unit operable to specify, based on the position coordinates, a region of a reference frame for each sub-block; a decoding unit operable to decode each sub-block to generate a corresponding portion of a target frame by performing a prescribed operation based on the motion vector and pixel values in the region of the reference frame specified by the specifying unit; and a combining unit operable to combine, based on the position coordinates, the plurality of portions generated by the decoding unit to generate a block of the target frame.

Note that the pixel values represent intensity signals and/or color signals.

According to this construction, the video decoding device can decode video data of all macroblock types using a single program or calculating device. As a result, it is no longer necessary to write programs or provide calculating devices corresponding to all the macroblock types. This reduction in complexity leads to a reduction in design costs.

The video data may be encoded in compliance with the MPEG-4AVC standard, the prescribed operation may be a motion compensation operation for decoding encoded video data in compliance with the MPEG-4AVC standard, and each block may be a macroblock or sub-macroblock in compliance with the MPEG-4AVC standard.

According to this construction, the video decoding device of the present invention is able to restore video data in compliance with the MPEG-4AVC standard.

The prescribed size may be 4×4 pixels.

According to this construction, the video decoding device is able to execute motion compensation on a 4×4 pixel sub-block, which is the minimum unit of motion compensation in the MPEG-4AVC standard. Macroblocks and sub-macroblocks larger than 4×4 pixels in size are split to form 4×4 pixel blocks, and can therefore be dealt with using the motion compensation operation for the 4×4 pixel minimum unit.

The encoded video data may include information that specifies a size of each block of the source frame, the splitting unit may be operable, if the size is less than 8×8 pixels, to split the block into 4×4 pixel sub-blocks, and the video decoding device may further include a second splitting unit operable, if the size is 8×8 pixels or larger, to generate one or more 8×8 pixel sub-blocks from the block, and calculate position coordinates for each 8×8 pixel sub-block; and a second decoding unit operable to decode each 8×8 pixel sub-block to generate a corresponding portion of the target frame, by performing a prescribed operation based on the motion vector and pixel values in the region of the reference frame specified by the specifying unit.

This construction enables selective execution of the motion compensation operation for sub-blocks of 4×4 pixels and the motion compensation operation for sub-blocks of 8×8 pixels, improving the usefulness of the video coding device. In addition, since splitting is not required if the blocks are 8×8 pixels in size, a reduction in processing time is possible.

The video decoding device of may further include: a memory operable to receive and store region pixel data for a region of the reference frame corresponding to a current block of the source frame, wherein the memory is operable to receive the region pixel data before the current block is split by the splitting unit, the specifying unit is operable to specify the region pixel data the memory, and the decoding unit is operable to decode each sub-block using the region pixel data stored in the memory.

According to this construction, the pixel data for the region of the reference frame corresponding to the current block are stored in advance in the local memory. Transmitting pixel data in larger block units rather than the smaller sub-block units enables a reduction in the amount of data transmitted from the frame memory. This in turn, enables some reduction in the time taken to perform the motion compensation operation, and in the bandwidth required to transmit pixel data from the frame memory during motion compensation.

The present invention may be a video decoding method for decoding encoded video data including motion vectors that correspond uniquely to rectangular blocks in each of a plurality of frames, by performing a series of motion compensation operations using the motion vectors, the video decoding method including steps of: splitting a block of a source frame into a plurality of rectangular sub-blocks of a prescribed size, and calculate position coordinates for each sub-block; specifying, based on the position coordinates, a region of a reference frame for each sub-block; decoding each sub-block to generate a corresponding portion of a target frame by performing a prescribed operation based on the motion vector and pixel values in the region of the reference frame specified by the specifying unit; and combining, based on the position coordinates, the plurality of portions generated by the decoding unit to generate a block of the target frame.

This method enables the video decoding device to decode encoded video data having source frame units which are blocks of various sizes, using only the motion compensation operation corresponding to the smallest block size.

The present invention may be a video decoding program constituting a procedure for causing a computer to decode encoded video data including motion vectors that correspond uniquely to rectangular blocks in each of a plurality of frames, by performing a series of motion compensation operations using the motion vectors, the program including steps of: splitting a block of a source frame into a plurality of rectangular sub-blocks of a prescribed size, and calculate position coordinates for each sub-block; specifying, based on the position coordinates, a region of a reference frame for each sub-block; decoding each sub-block to generate a corresponding portion of a target frame by performing a prescribed operation based on the motion vector and pixel values in the region of the reference frame specified by the specifying unit; and combining, based on the position coordinates, the plurality of portions generated by the decoding unit to generate a block of the target frame.

A computer executing this program is able to decode encoded video data having source frame units that are blocks of various sizes, using only the motion compensation operation corresponding to the smallest block size.

The present invention may be a video decoding integrated circuit for decoding encoded video data including motion vectors that correspond uniquely to rectangular blocks in each of a plurality of frames, by performing a series of motion compensation operations using the motion vectors, the video decoding device including: a splitting circuit operable to split a block of a source frame into a plurality of rectangular sub-blocks of a prescribed size, and calculate position coordinates for each sub-block; a specifying circuit operable to specify, based on the position coordinates, a region of a reference frame for each sub-block; a decoding circuit operable to decode each sub-block to generate a corresponding portion of a target frame by performing a prescribed operation based on the motion vector and pixel values in the region of the reference frame specified by the specifying unit; and a combining circuit operable to combine, based on the position coordinates, the plurality of portions generated by the decoding unit to generate a block of the target frame.

Implementation of the integrated circuit enables a video decoding device to decode encoded video data having source frame units that are blocks of various sizes, using only the motion compensation operation corresponding to the smallest block size.

BRIEF DESCRIPTION OF THE DRAWINGS

These and other objects, advantages and features of this invention will become apparent from the following description thereof taken in conjunction with the accompanying drawings which illustrate a specific embodiment of the invention.

In the drawings:

FIG. 2 is a block diagram showing details of a motion compensation unit and an addition unit;

FIGS. 3A to 3H show types of macroblock and sub-macroblock;

DESCRIPTION OF THE PREFERRED EMBODIMENT

The following describes a video decoding device of a first embodiment of the present invention with reference to the drawings. Note that blocks subject to motion compensation operations are referred to as motion compensation blocks, and that 4×4 pixel motion compensation blocks may also be referred to as minimum blocks.

First Embodiment

Construction

First, a functional composition of the video decoding device of the present invention is described with reference to FIG. 1 and FIG. 2.

Figure 1:
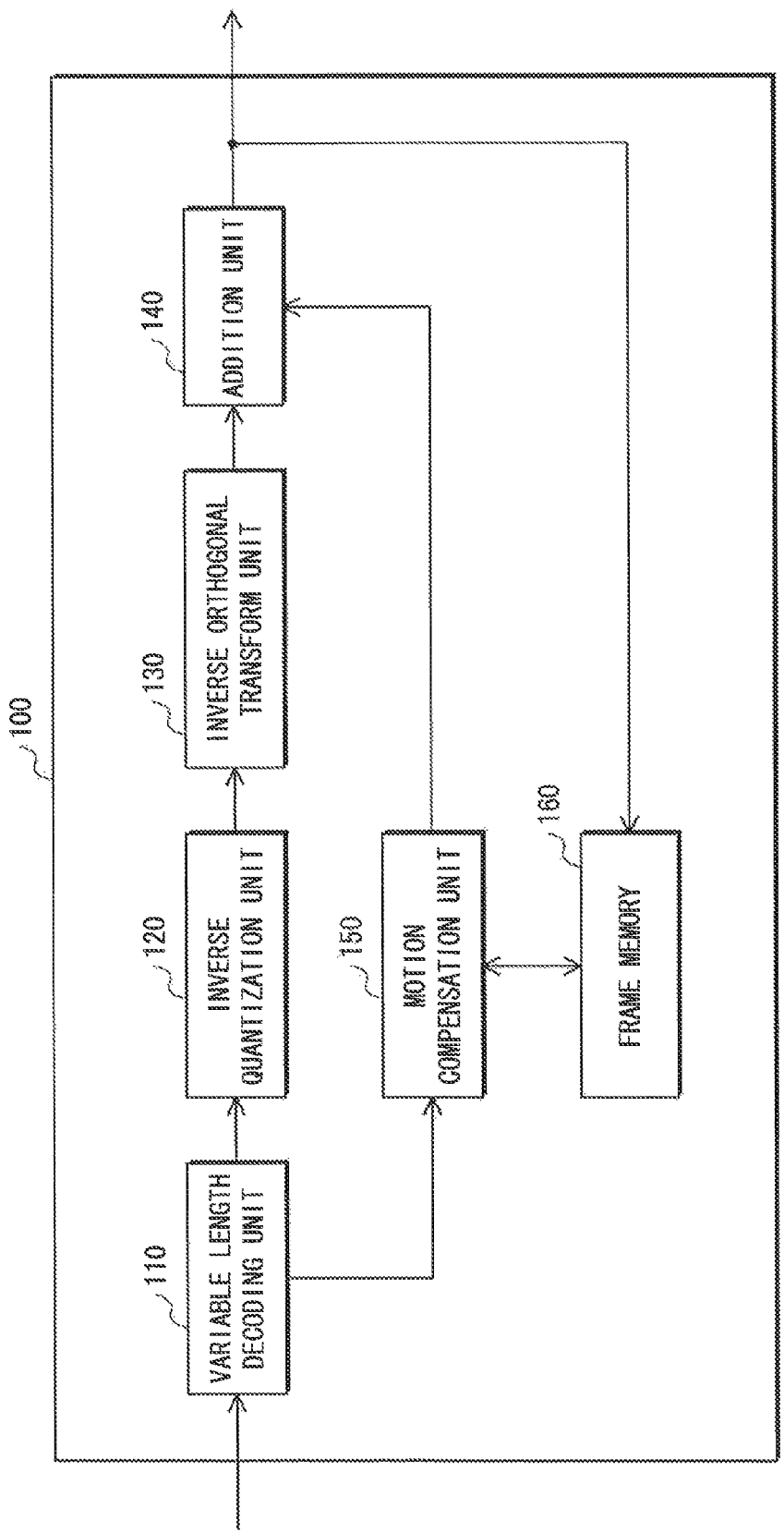
FIG. 1 is a block diagram showing a functional composition of a video decoding device according to a first embodiment of the present invention.

FIG. 1 is block diagram showing the functional composition of a video decoding device 100. As shown in FIG. 1, the video decoding device 100 is composed to include a variable length decoding unit 110, an inverse quantization unit 120, an inverse orthogonal transform unit 130, an addition unit 140, a motion compensation unit 150, and a frame memory 160. The units perform decoding based on the conventional MPEG-4AVC standard, and descriptions of processing identical to conventional processing have therefore been simplified.

The variable length decoding unit 110 includes a function for decoding inputted variable length signals to calculate quantization coefficients and motion vectors.

The inverse quantization unit 120 includes a function for performing inverse quantization on quantized data to recover the frequency components of the data.

The inverse orthogonal transform unit 130 includes a function for recovering the pixel data from the frequency components. The pixel data includes information relating to the brightness and color of pixels. Note that the decoded pixel values may be difference values between the pixel values of objects in the encoded frame and a previous or subsequent reference frame.

The addition unit 140 includes a function for combining the data outputted from the inverse orthogonal transform unit 130 and the data outputted from the motion compensation unit 150 to generate the pixel data for the macroblock that is being decoded. The data outputted from the addition unit 140 may be stored in the frame memory 160 for use as a reference frame block, or outputted to an external monitor or the like. Further details are described in a later section with reference to FIG. 2.

The motion compensation unit 150 includes a function to set a previously decoded frame as a reference frame, and to extract pixel information for the macroblock that is to be decoded using the motion vector. Details of this process are described in a later section with reference to FIG. 2.

The frame memory 160 includes a function to store the decoded frame data. The stored frame data becomes a reference frame for decoding other frames in the motion compensation unit 150.

The following describes detailed functions of the motion compensation unit 150 and addition unit 140 shown in FIG. 1 with reference to the function block diagram of FIG. 2. These functions enable the motion compensation that is the main subject of the present invention.

As shown in FIG. 2, the addition unit 140 includes a pixel storage address conversion unit 141 and a local memory 142. The addition unit 140 includes a function to obtain a block of the original frame corresponding to the macroblock by storing pixel data decoded and outputted by the motion compensation unit 150 at a prescribed location in the local memory 142.

The pixel storage address conversion unit 141 includes a function to determine addresses in the local memory 142 at which to store the data resulting from the operation of the motion compensation unit 150.

The local memory 142 includes a function to combine the decoded frame data transmitted from a 4×4 pixel motion compensation operation unit 155 and data from the inverse orthogonal transform unit 130, based on address information obtained from the pixel storage address conversion unit 141. The local memory 142 further functions to transmit the combined data stored therein.

As shown in FIG. 2, the motion compensation unit 150 is composed to include a splitting unit 151, a reference pixel address operation unit 152, DMA (Direct Memory Access) unit 153, local memory 154, and the 4×4 pixel motion compensation operation unit 155.

The splitting unit 151 functions to receive from the variable length decoding unit 110 a macroblock type indicating the size of a given macroblock, coordinate information of a top left pixel in the macroblock, the motion vector of the macroblock, information as to whether bidirectional motion compensation is used, and a reference frame number. The splitting unit 151 further functions to split the macroblock into 4×4 minimum blocks, the number of which depends on the macroblock type, to calculate coordinates of the top left pixel in each minimum block, and to output these coordinates and the motion vector of the macroblock to the 4×4 pixel motion compensation operation unit 155 in a defined order. The splitting unit 151 further functions to transmit the coordinates of the minimum blocks and information concerning the reference frame number to the reference pixel address operation unit 152.

The reference pixel address operation unit 152 functions to determine regions of the reference frame corresponding to the minimum blocks based on the coordinates of the top left pixels in the minimum blocks and the reference frame number, and to transmit pixel data of the regions to the DMA unit 153.

The DMA unit 153 functions to acquire from the frame memory 160 pixel data of the regions indicated by the information transmitted from the reference pixel address operation unit 152, and to write the pixel data to the local memory 154. Here, the pixel data stored in the local memory 154 by the DMA unit 153 are determined based on the coordinates of the top left pixels transmitted by the splitting unit 151 and the reference frame number. Note, however, that the region of the reference frame for the 4×4 pixel minimum block is 9×9 pixels in size. This is because a six tap filter is used to decode one pixel. Consequently, pixel data for three pixels to the right and two pixels to the left of the desired pixel are required in order to execute the operation to decode the pixels with high precision (½ pixel accuracy). Pixel data for the two pixels above and the three pixels below the desired pixel are similarly required in the vertical direction.

The local memory 154 functions to store temporarily the pixel data read from the frame memory 160 and transmitted by the DMA unit 153. The local memory 154 further functions to transmit the pixel data required for decoding of the stored pixel data, to the 4×4 pixel motion compensation operation unit 155.

The 4×4 pixel motion compensation operation unit 155 is a program or operation device that functions to execute the motion compensation operation based on the motion vector and top left coordinate of each minimum block transmitted from the splitting unit 151 and the pixel data of the region of the reference frame transmitted from the local memory 154.

Note that in the above description the splitting unit of the present invention is the splitting unit 151. The specifying unit of the present invention is the reference address operation unit 152. The decoding unit of the present invention is the 4×4 pixel motion compensation operation unit 155. The combining unit of the present invention is the addition unit 140.

Data

The following describes data relating to the video decoding device 100.

First the macroblock types are described briefly, with reference to FIG. 3.

MPEG-4AVC supports four types of macroblock, with sizes of 16×16 pixels, 16×8 pixels, 8×16 pixels, and 8×8 pixels.

Moreover, the 8×8 pixel type may be split further to form sub-macroblocks having sizes of 8×4 pixels, 4×8 pixels, or 4×4 pixels.

FIGS. 3A to 3H show these macroblock types and sub-macroblock types in a simplified manner.

FIG. 3A shows the macroblock of 16×16 pixels, FIG. 3B shows the macroblock of 16×8 pixels, FIG. 3C shows the macroblock of 8×16 pixels, and FIG. 3D shows the macroblock of 8×8 pixels.

Further, FIG. 3E shows the sub-macroblock of 8×8 pixels, FIG. 3F shows the sub-macroblock of 8×4 pixels, FIG. 3G shows the sub-macroblock of 4×8 pixels, and FIG. 3H shows sub-macroblock of 4×8 pixels.

A single motion vector is defined for each macroblock and for each sub-macroblock.

Note that in the figures the values shown in each block indicate an order of processing at decoding.

According to the MPEG-4AVC standard, one of these seven macroblock types is selected when compressing video data. Data compression is then performed separately for each macroblock. A device that is to decode the compressed data must therefore support all the macroblock types.

The following describes data that the splitting unit 151 receives from the variable length decoding unit 110, with reference to FIG. 4.

Figure 4A:
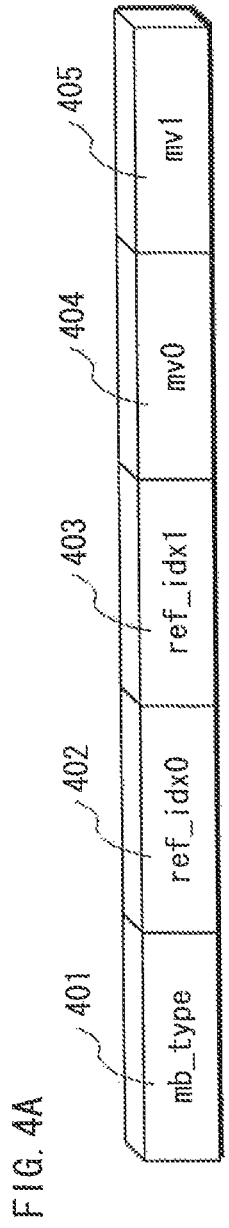
FIGS. 4A and 4B are conceptual figures showing data received by the motion compensation unit from a variable length decoding unit.
Figure 4B:
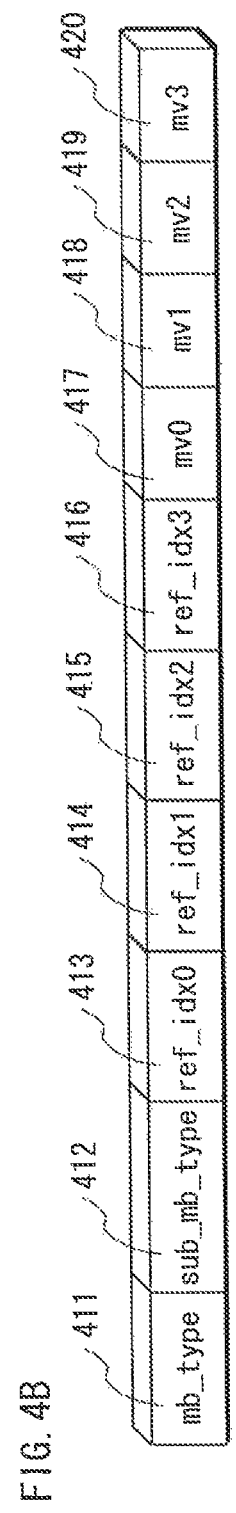

FIG. 4A shows data for the case where frame that is to be decoded has a macroblock type other than 8×8 pixels. FIG. 4B shows data for the case where frame that is to be decoded has a macroblock type of 8×8 pixels.

As shown in FIG. 4, the data that the splitting unit 151 receives is composed of the following fields: mb_type 401, ref_idx0 402, ref_idx1 403, mv0 404, mv1 405. The number of ref_idx and mv fields varies according to the macroblock type. Specifically, for the 16×16 pixel macroblock, there is one ref_idx field and one mv field. Similarly, for the 16×8 pixel and 8×16 pixel macroblocks there are two of each, and for the 8×8 pixel macroblock four of each.

The mb_type 401 is information indicating whether the macroblock is of the 16×16 pixel type, the 16×8 pixel type, the 8×16 pixel type, or the 8×8 pixel type. For example, the mb_type 401 may be 4-bit data such that "0" indicates the 16×16 pixel type, "1" indicates the 16×8 pixel type, "2" indicates the 8×16 pixel type, and "3" indicates the 8×8 pixel type.

The ref_idx0 402 and ref_idx1 403 are information indicating the frame number of the reference frame used to decode the macroblock, and the DMA unit 153 acquires pixel values of the reference frame block from the frame memory 160 based on this information.

The mv0 404 and mv1 405 are information representing the motion vector of the corresponding macroblock. The mv0 404 corresponds to the ref_idx0 402, and the mv1 405 corresponds to the ref_idx1 403. When the macroblock is of the 8×16 pixel type, the mv0 404 corresponds to the block marked "0" in FIG. 3C, and the mv1 405 corresponds to the block marked "1" in FIG. 3C.

The ref_idx and mv form pairs, and the number of pairs varies according to the macroblock type as described above. FIG. 4A shows the data for the 16×8 pixel type or the 8×16 pixel type.

When the macroblock is of the 8×8 pixel type, the data received by the splitting unit 151 is composed of the following data fields: mb_type 411, sub_mb_type 412, ref_index0 413, ref_idx1 414, ref_idx2 415, ref_idx3 416, mv0 417, mv1 418, mv0 419, and mv1 420.

The mb_type 411 is information indicating that the macroblock is of the 8×8 pixel type.

The sub_mb_type 411 is information indicating whether the sub-macroblocks is of the 8×8 pixel type, the 8×4 pixel type, the 4×8 pixel type, or the 4×4 pixel type. For example, the submb_type 411 may be defined as 4-bit data such that "0" indicates the 8×8 pixel type, "1" indicates the 8×4 pixel type, "2" indicates the 4×8 pixel type, and "3" indicates the 4×4 pixel type.

The ref_idx and the mv are basically the same as those shown in FIG. 4A. Here, however, it is the reference frame number of the sub-macroblock and the associated motion vector that are in correspondence.

Note also that the mv0 417 corresponds to the ref_idx0 413, mv1 418 to ref_idx1 414, mv2 419 to ref_idx2 415, and mv3 420 to ref_idx3 416. Further, if the data shown in FIG. 4B represents the 4×4 pixel sub-macroblock type of FIG. 3H, the mv0 417 corresponds to the block marked "0" in FIG. 3H. Similarly, the mv1 418 corresponds to the blocked marked "1" as shown in FIG. 3H, the mv2 419 to the block marked "2", and the mv3 420 to the block marked "3".

As in the case of the macroblocks, the number of ref_idx and mv fields in a sub-macroblock vary according to the sub-macroblock type. Specifically, for the 8×8 pixel sub-macroblock there is one ref_idx field and one mv field, for the 8×4 pixel and 4×8 pixel sub-macroblock two of each, and for the 4×4 pixel sub-macroblock four of each.

Operations

Figure 5:
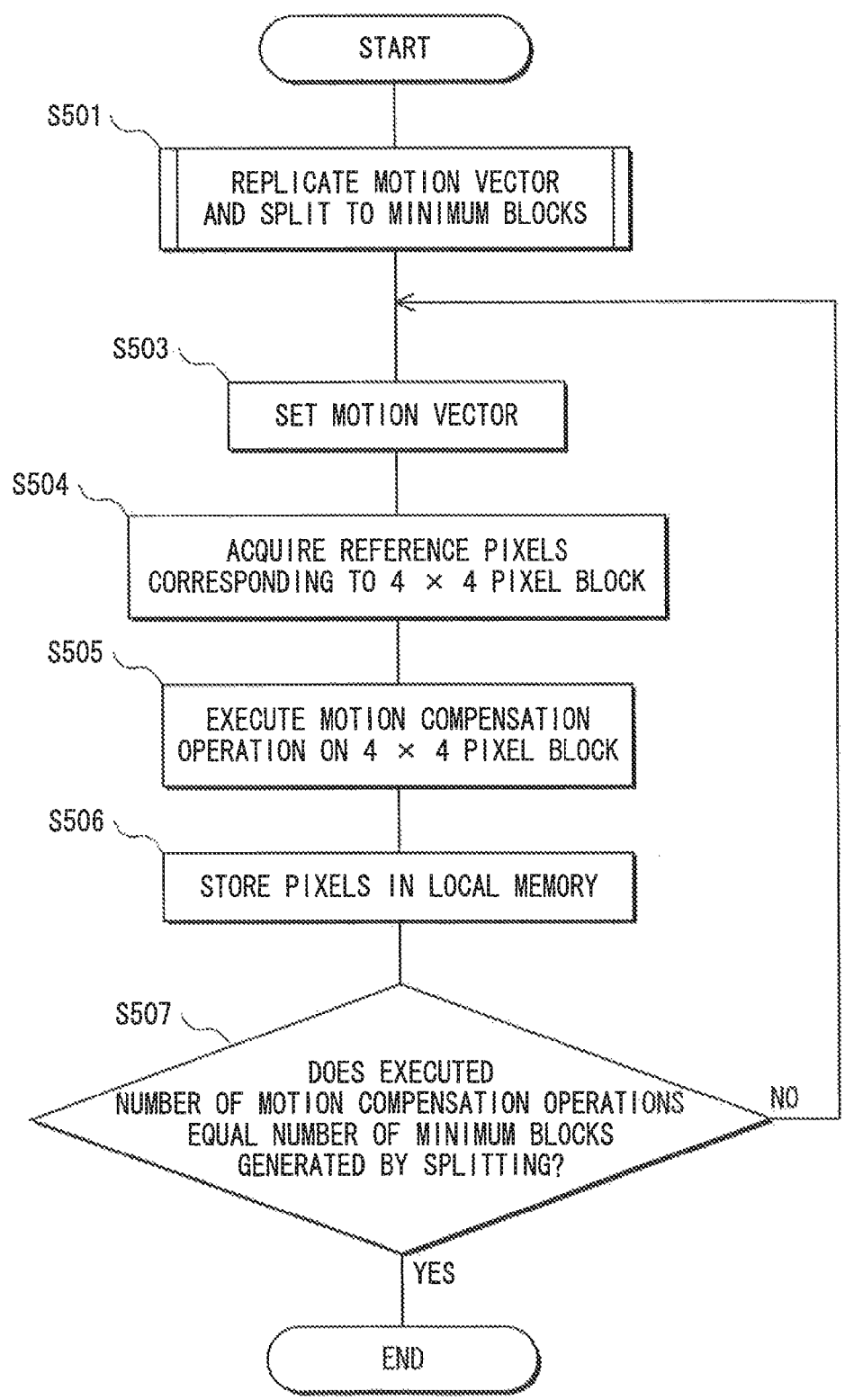
FIG. 5 is a flow-chart showing operations of the motion compensation unit of the video decoding device according to the first embodiment of the present invention.
Figure 6:
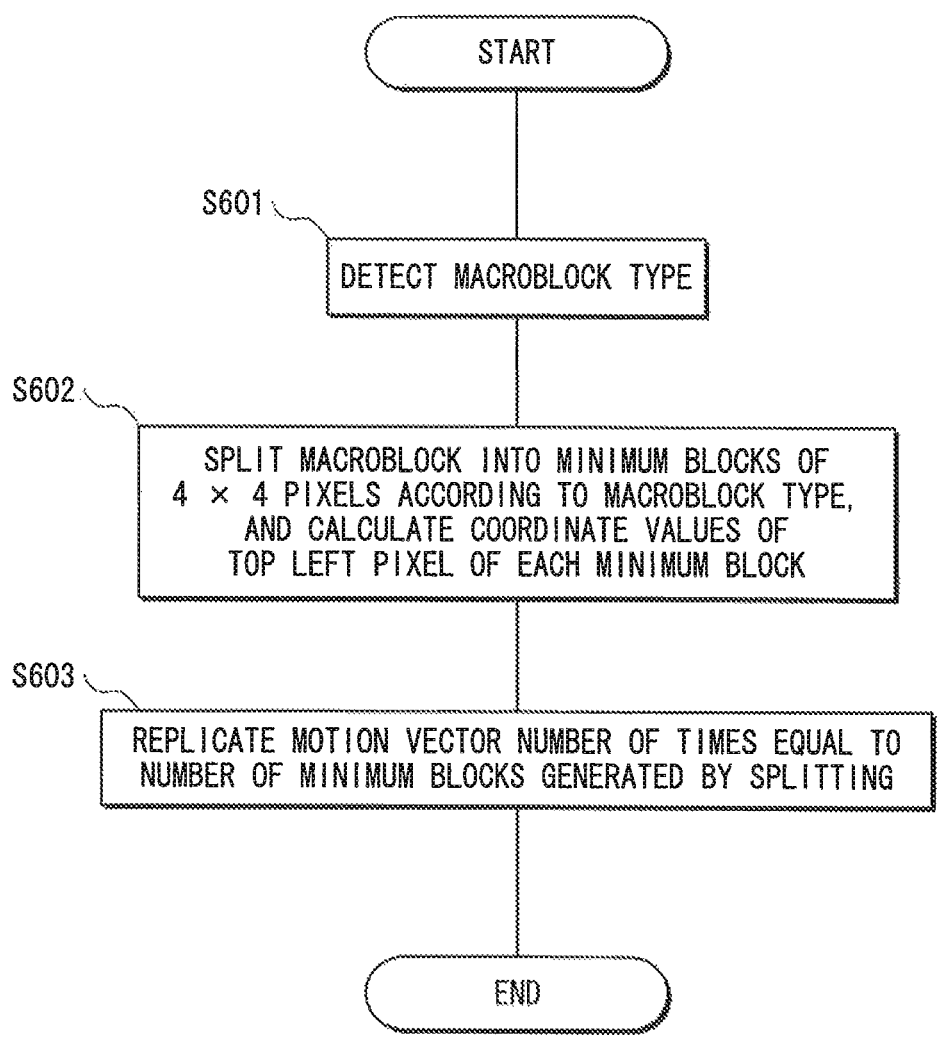
FIG. 6 is a flow-chart showing details of processing of Step S501 in FIG. 5.
Figure 7:
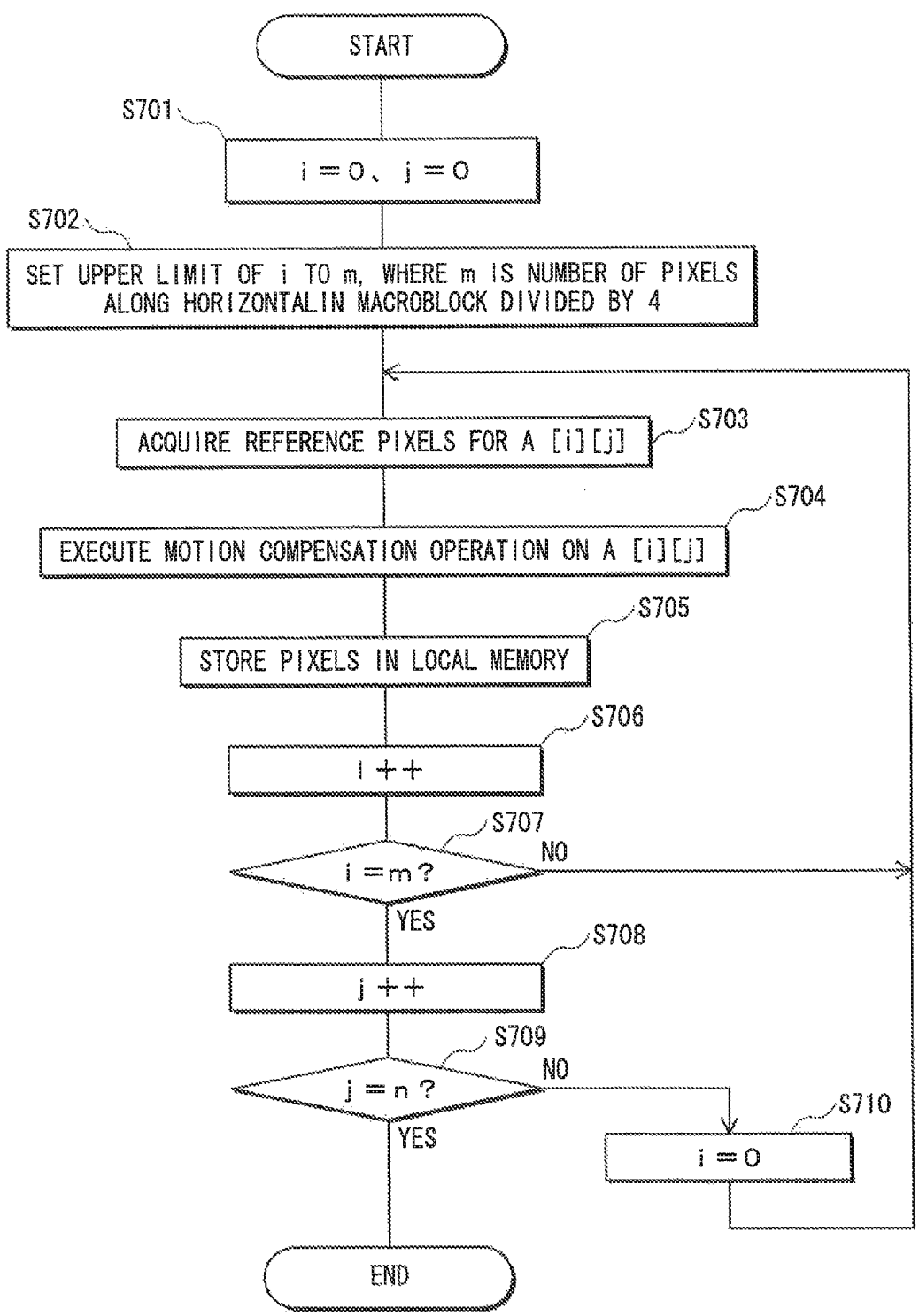
FIG. 7 is a flow-chart showing the processing of successive motion compensation blocks split from a macroblock.

The following describes the video decoding device 100 of the present embodiment with a particular emphasis on the motion compensation operation, with reference to the flowcharts shown in FIGS. 5 to 7. Other operations related to the decoding are omitted since they follow conventional methods.

The following describes the operations of the video decoding device 100 with particular reference to the motion compensation unit 150 using FIG. 5.

The splitting unit 151 of the video decoding device 100 initially duplicates motion vector to generate the required number, and performs processing to split the macroblock into minimum blocks (Step S501). The details of this process are described in a later section with reference the flowchart of FIG. 6.

The motion vectors generated by the splitting unit 151 are transmitted to the 4×4 pixel motion compensation operation unit 155 (Step S503).

The reference pixel address operation unit 152 calculates the address in the frame memory 160 of pixels in the region of the reference frame based on the coordinates of the top left pixel of the minimum block calculated in the splitting unit 151 and the duplicated motion vectors. Specifically, the reference pixel address operation unit 152 calculates coordinates of the region of the reference frame to be specified using the transmitted top left coordinates and the motion vector. Two is subtracted from the both the x coordinate value and the y coordinate value of the calculated pixel coordinate values and the addresses of pixels within a 9×9 pixel block are obtained, where the coordinates obtained by the subtraction give the coordinates of the top left corner in the 9×9 pixel region. In the event that part of the required 9×9 pixel region is beyond the edge of the reference frame the missing values are interpolated from the pixel values at the edge of the reference frame.

The DMA unit 153 then reads the 9×9 pixel data from the frame memory 160 in accordance with the calculated addresses, and stores the result in the local memory 154 (Step S504).

The 4×4 pixel motion compensation operation unit 155 then executes an operation to decode the current minimum block using a 6 tap filter, based on the pixel data from the region of the reference frame stored in the local memory 154 and the motion vectors (Step S505).

The pixel data decoded in the 4×4 pixel motion compensation operation unit 155 is stored in the local memory 142 (Step S506).

The video decoding device 100 then judges whether the number of executed motion compensation operations equals the number of minimum blocks generated by splitting the macroblock (Step S507). The processing of this step (i.e. the judgement relating to the number of executions) is described in detail in a later section with reference to the flow-chart of FIG. 7.

If the number of executions is not equal to the number of minimum blocks (NO in Step S507), the processing returns to Step S503 and executes Step S503 and subsequent steps.

If the number of executions is equal to the number of minimum blocks (YES in Step S507), the processing in relation to the macroblock ends.

The following describes details of the processing to split and duplicate the motion vectors in Step S501 of FIG. 5, with reference to FIG. 6.

First, the splitting unit 151 analyzes the data transmitted from the variable length decoding unit 110 and detects the type of macroblock subject to processing by the 4×4 pixel motion compensation operation unit 155 (Step S601).

The splitting unit 151 then calculates the number of minimum blocks in the x-axis direction and the number of minimum blocks in the y-axis direction based on the detected macroblock type, and splits the macroblock into 4×4 pixel minimum blocks. Note that here splitting refers to calculation of the number of minimum blocks to be generated, and of the coordinates of the top left pixel in each minimum block (Step S602).

The splitting unit 151 duplicates the motion vector to generate one motion vector per minimum block, enabling one motion vector to be associated with the top left pixel of each minimum block, and ends the processing (Step S603).

Lastly, the steps for processing the minimum blocks are described below with reference to the flow-chart of FIG. 7. Firstly, note that the minimum blocks are expressed in the form A[i] [j] to make it possible to distinguish between minimum blocks generated by splitting the macroblock. Here, i is an x-direction index and j is a y-direction index.

The following describes processing steps from the point where the splitting unit 151 receives one of the macroblocks to the point where processing related to the macroblock is completed. It describes, in other words, splitting the macroblock into minimum blocks and then sequentially processing all the resulting minimum blocks, with reference to the flow-chart of FIG. 7.

As shown in FIG. 7, the splitting unit 151 initially sets i and j to 0 (Step S701). The splitting unit 151 then sets an upper limit m of i and an upper limit n of j to values respectively obtained by dividing the x-direction and y-direction numbers of pixels by four in accordance with the microblock type (Step S702).

The reference pixel address operation unit 142 then acquires pixel data from a region of the reference frame corresponding to the minimum block (Step S703). The acquired data is stored in the local memory 142. The 4×4 pixel motion compensation operation unit 155 executes a motion compensation operation on the minimum block A[i] [j] based on the pixel data stored in the local memory 142 and the motion vector transmitted from the splitting unit 151 (Step S704). The 4×4 pixel motion compensation operation unit 155 stores the decoded data for the minimum block A[i] [j] resulting from the motion compensation operation in the local memory 142 (Step S705).

Following the motion compensation operation for the minimum block A[i] [j], the splitting unit 151 adds one to i to find a new i (Step S706), and judges whether the new i is equal to m (Step S707). If i is equal to m (YES in Step S707), the splitting unit 151 adds one to j (Step S708), and judges whether j is equal to n (Step S709).

If j is equal to n (YES in Step S709) the processing relating to the current macroblock ends. If j is not equal to n (NO in Step S709), the splitting unit 151 resets i to zero (Step S710), returns to Step S703 and executes the processing therefrom. Note that in Step S707 too, if i is not equal to m, the processing returns to Step S703 and executes the subsequent steps.

Figure 8:
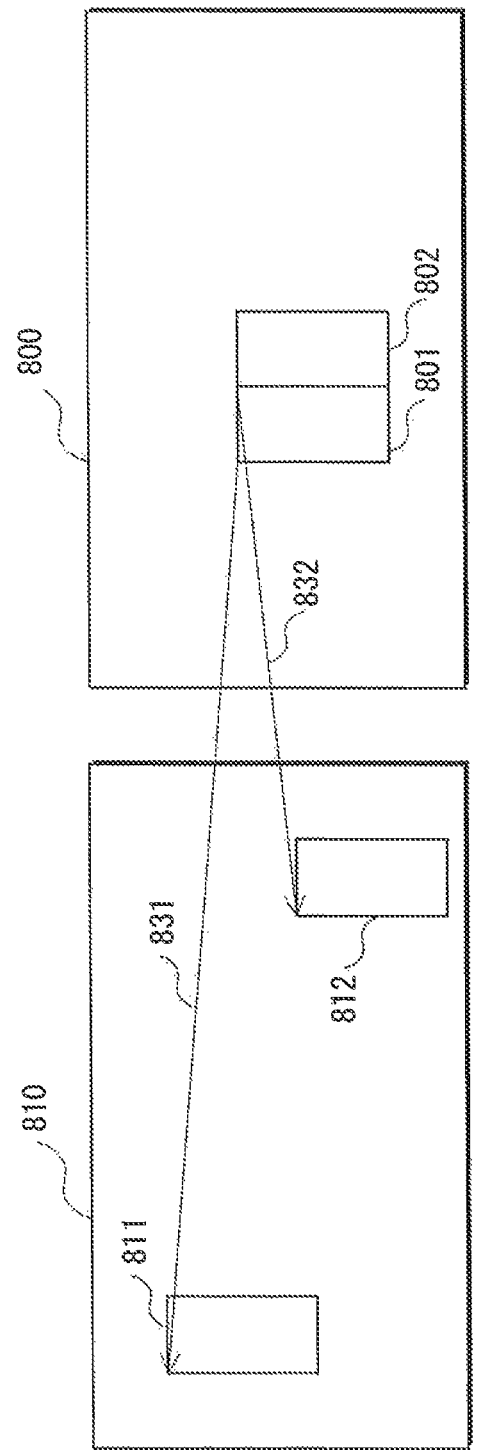
FIG. 8 shows correspondences between macroblocks of a frame that is to be decoded and regions of a reference frame in the prior art.
Figure 9:
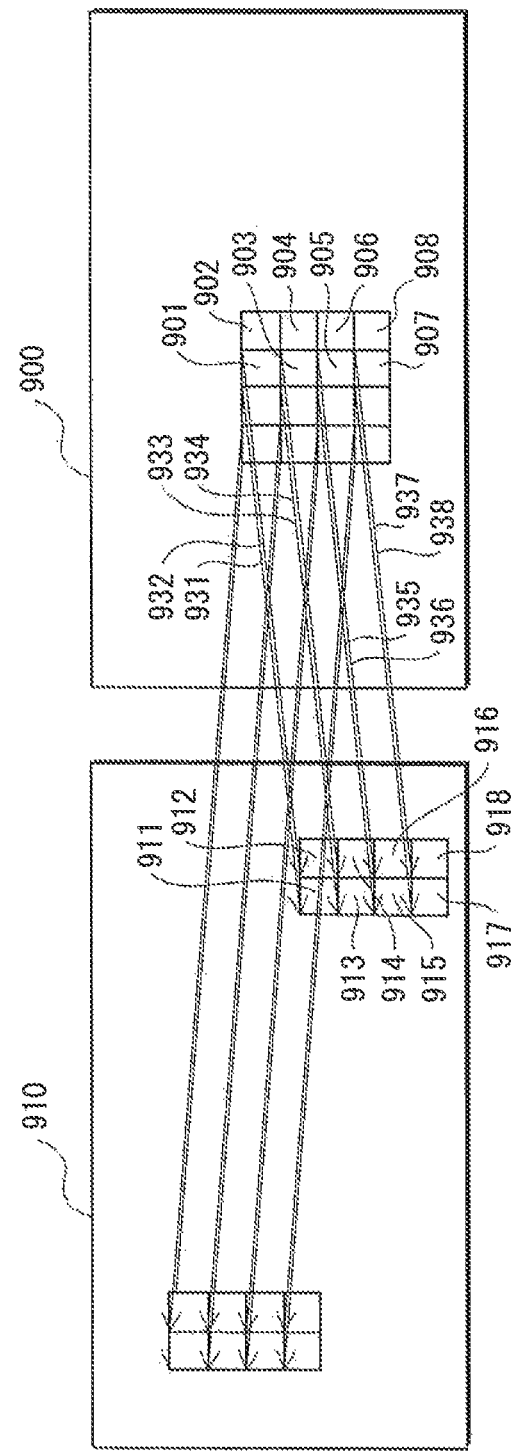
FIG. 9 shows correspondences between macroblocks of a frame that is to be decoded and regions of a reference frame in the present invention.

FIG. 8 and FIG. 9 were prepared to clarify the difference between conventional technology and the present invention. FIG. 8 shows the correspondences between blocks of the source frame and regions of the reference frame for motion compensation according to the conventional technology, and FIG. 9 shows the correspondences between blocks of the source frame and the regions of the reference frame for motion compensation according to the present invention.

In FIG. 8 suppose that a frame 800 is a source frame, and that a frame 810 is a reference frame for generating a target frame corresponding to the frame 800. The region 811 in the frame 810 corresponds to a motion compensation block 801 in the frame 800. Vector 831 is then the motion vector for the motion compensation block 801. Likewise, the region 812 is the region of the reference frame corresponding to the motion compensation block 802, and vector 813 is the motion vector corresponding to the motion compensation block 802. Note that motion compensation blocks 801 and 802 both 8×16 pixels in size.

According to conventional technology, the frame is restored by executing the motion compensation operation on units such as the motion compensation blocks 801 or 802.

However, the present invention differs from conventional technology in the following respect. This is that even if motion compensation blocks have been defined as blocks such as the motion compensation blocks 801 or 802, each defined motion compensation block is split to form a plurality of 4×4 pixel motion compensation blocks, and the target frame is generated by executing a motion compensation operation on each of these 4×4 pixel motion compensation blocks.

FIG. 9 illustrates these operations. Consider, for instance, motion block 802. In the present embodiment, the 8×16 pixel motion compensation block 802 is split into the 4×4 motion compensation blocks 901 to 908. Since the motion compensation block 802 is split into eight motion compensation blocks, eight motion vectors 931 to 938 are generated by duplication. A motion compensation operation is then applied to each of the motion compensation blocks 901-908 on an individual basis using a respective motion vector.

Owing to the inclusion of a function to split macroblocks into minimum blocks of 4×4 pixels, the video decoding device of the present invention is able to support all the macroblock types, and to decode macroblocks of any type using a single motion compensation operation program. Since one program supports all types of macroblock, the time and effort required to produce the video decoding device can be reduced and there is no need to load redundant programs in the memory.

Second Embodiment

A second embodiment of the present invention enhances the usefulness of the video decoding device by supporting 8×8 pixel sub-blocks in addition to the 4×4 pixel minimum blocks described in the first embodiment.

More specifically an 8×8 pixel motion compensation operation unit supports block sizes of 8×8 pixels or larger and a 4×4 pixel motion compensation operation unit supports the three block sizes of 8×4 pixels, 4×8 pixels, and 4×4 pixels. This enhances the usefulness of the device as a video decoding device because processing speeds can be increased. For the 8×8 macroblock, in particular, the processing to split the macroblock in the splitting unit can be omitted, which allows for an increase in processing speed.

Construction

Differences between the first and second embodiments are described with reference to FIG. 10. Functional units not described can be assumed to work in the same way as those of the first embodiment. Since the units of the construction which differ from the first embodiment are included in the motion compensation unit, the following describes the motion compensation unit of the video decoding device of the second embodiment.

Figure 10:
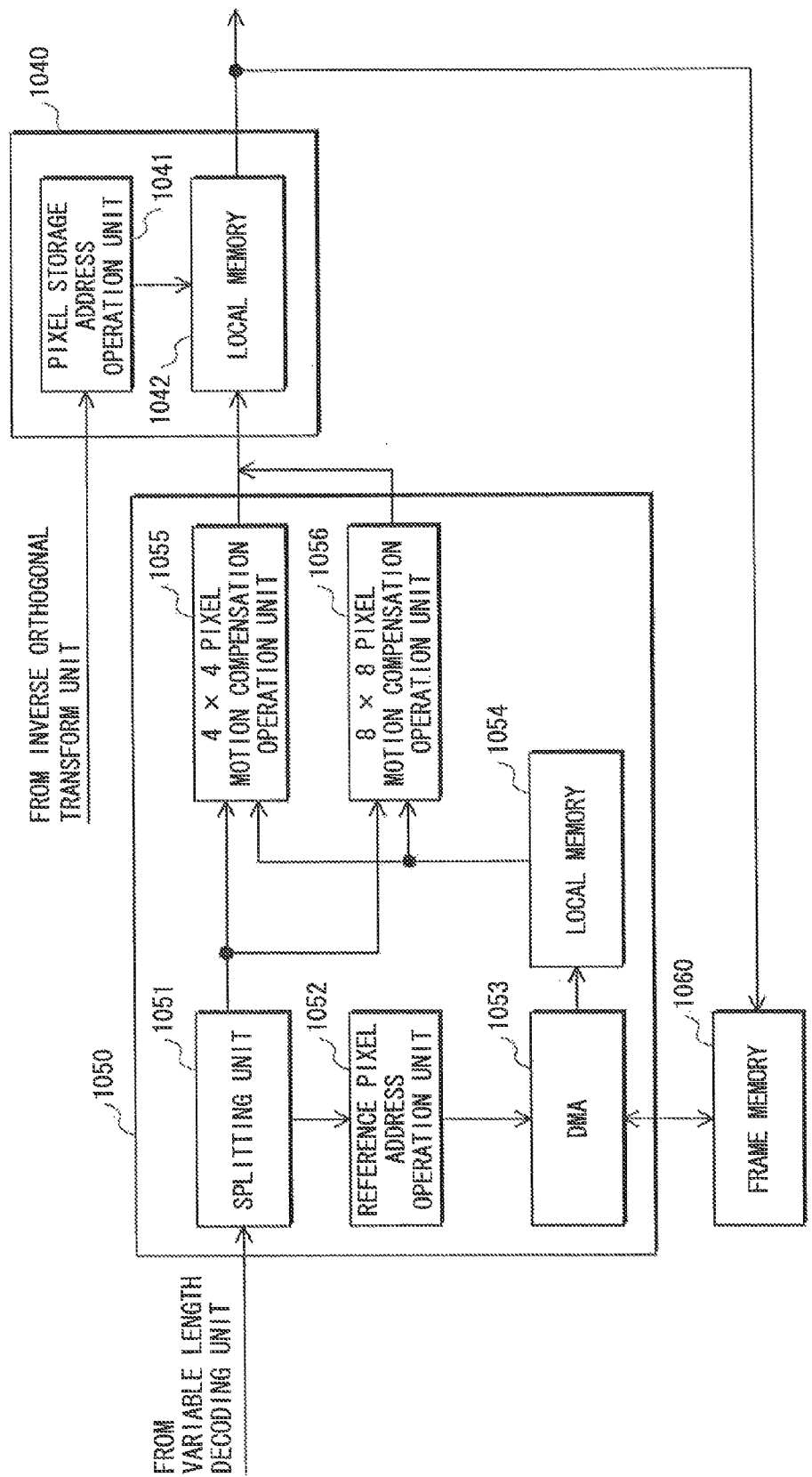
FIG. 10 is a block diagram showing a functional composition of a motion compensation unit and an addition unit according to a second embodiment.

FIG. 10 is a block diagram showing a detailed functional composition of a motion compensation unit 1050 and an addition unit 1040, and corresponds to FIG. 2 of the first embodiment.

As shown in FIG. 10, the motion compensation unit 1050 includes an 8×8 pixel motion compensation unit 1056 in addition to a 4×4 pixel motion compensation unit 1055.

The 8×8 pixel motion compensation unit 1056 includes a function for executing a motion compensation operation on an 8×8 pixel block, and executes the motion compensation operation when given the motion vector and the motion compensation block information by a splitting unit 1051.

The 4×4 pixel motion compensation unit 1055 executes the motion compensation operation when given the motion vector and the motion compensation block information by the splitting unit 1051.

The splitting unit 1051 differs from that of the first embodiment in having functions for changing the splitting size depending on the macroblock type, for determining based on the splitting size which of the motion compensation units is to execute the motion compensation operation, and for transmitting resulting data. Specifically, the splitting unit 1051 detects the macroblock type. In the case where the detected macroblock type is the 16×16 pixel macroblock, the 16×8 pixel macroblock, or the 8×16 pixel macroblock, the splitting unit 1051 splits the macroblocks into 8×8 pixel sub-blocks, and duplicates the motion vector to generate as many motion vectors as there are sub-blocks. The splitting unit then transmits the motion vectors and the coordinates of the top left pixel of each of the generated sub-blocks to the 8×8 pixel motion compensation unit 1056. Note that in the case that the detected macroblock type is the 8×8 pixel macroblock not including sub-macroblocks, splitting is unnecessary and each 8×8 pixel macroblock is treated as a single 8×8 pixel sub-block. On the other hand, when the detected macroblock type is the 8×8 pixel macroblock including 4×8 pixel sub-macroblocks, or 8×4 pixel sub-macroblocks, the splitting unit 1051 splits the macroblock into minimum blocks of 4×4 pixels, and duplicates the motion vector to generate as many motion vectors as there are minimum vectors. The splitting unit then transmits the motion vectors and the coordinates of the top left pixel of each of the generated minimum blocks to the 4×4 pixel motion compensation unit 1055. The process for the special case of the 8×8 pixel macroblock including 4×4 pixel sub-macroblocks is similar but without the splitting.

The other functional units have functions identical to the functional units of the first embodiment.

Operations

The operations characterizing the video decoding device of the second embodiment are described below with reference to the flow-chart of FIG. 11.

These operations are for determining whether to process 4×4 pixel blocks or 8×8 pixel blocks, based on the macroblock type.

Figure 11:
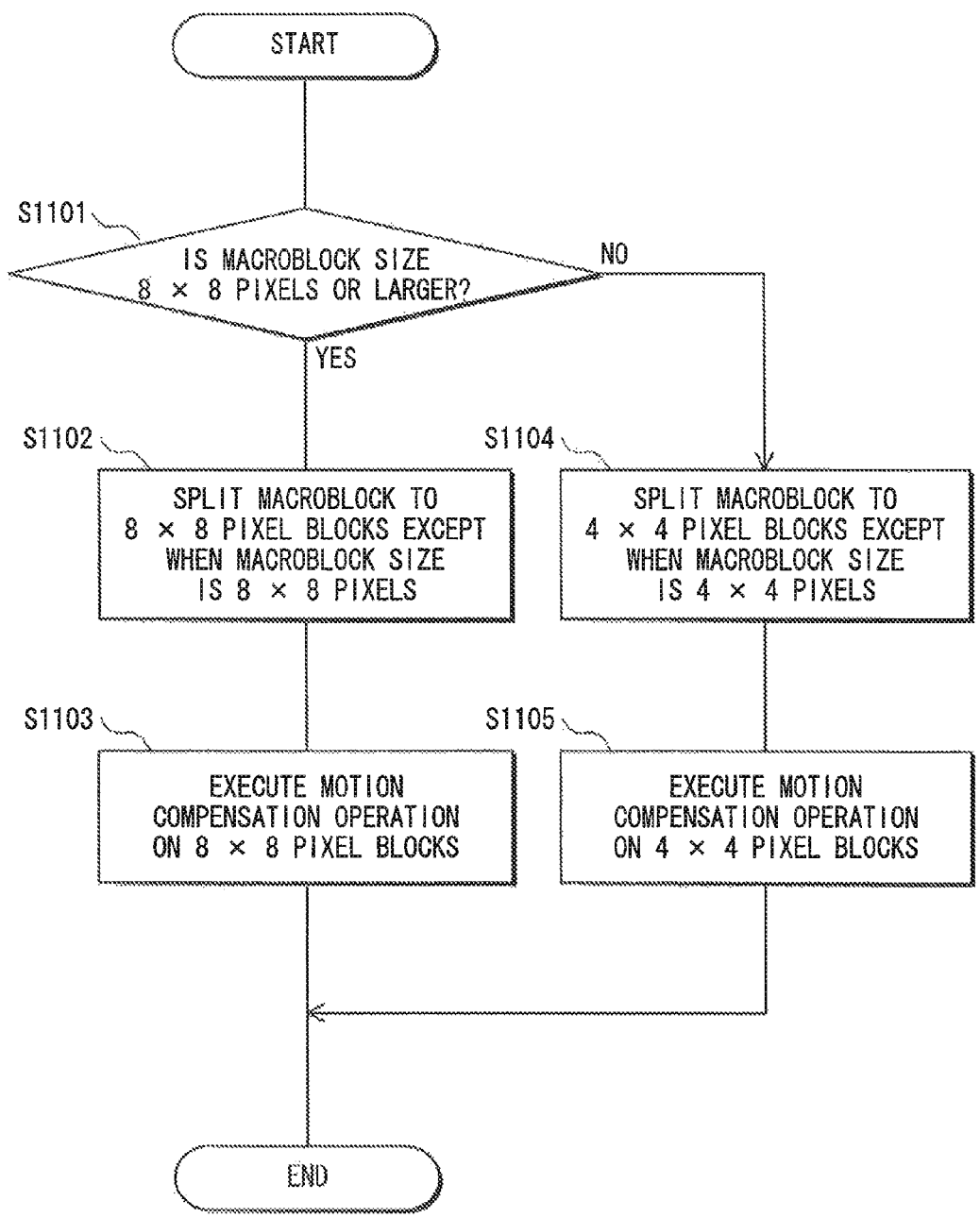
FIG. 11 is a flowchart showing selection operations of the motion compensation unit in a video decoding device according to the second embodiment.

First, as shown in FIG. 11, the splitting unit 1051 reads the macroblock type of the data received from the variable length unit to determine the microblock type (Step S1101).

If the macroblock is 8×8 pixels or larger (i.e. 16×16 pixels, 16×8 pixels, 8×16 pixels, or 8×8 pixels in size) (YES in Step S1101), the splitting unit 1051 splits the macroblock into 8×8 pixel blocks (Step S1102). Note that in the case of the 8×8 pixel macroblock splitting is not required.

The splitting unit 1051 then calculates the coordinates of the top left pixel in each of the 8×8 pixel blocks, and transmits the calculated coordinates and motion vectors to the 8×8 pixel motion compensation operation unit 1056 in a prescribed order. The splitting unit 1051 further transmits the coordinates of each top left pixel to the reference pixel address operation unit 1052 in order to obtain pixel values of a corresponding region of the reference frame.

The 8×8 pixel motion compensation operation unit 1056 executes motion compensation on each of the 8×8 pixel blocks based on the coordinates of the top left pixels and the motion vectors transmitted from the splitting unit 1051 in order to decode the frame data (Step S1103). The 8×8 pixel motion compensation operation unit 1056 then combines the decoded data for each of the generated 8×8 pixel blocks to obtain the block in the target frame corresponding to the macroblock.

If, on the other hand, the macroblock is less that 8×8 pixels in size (i.e. when the macroblock is of the 8×8 pixel type and the sub-macroblock is other than the 8×8 pixel type) (NO in Step 1101), the splitting unit splits the block into 4×4 pixel minimum blocks (Step 1104). The motion compensation for 4×4 pixel blocks is then performed on each of the minimum blocks generated by the splitting (Step S1105).

The addition unit 1040 combines the portions of the frame obtained by the 4×4 pixel motion compensation operation unit 1055 to form the block in the target frame corresponding to the macroblock of the source frame.

The above describes operations particular to the videodecoding device of the second embodiment.

The following compares the video decoding device of the second embodiment and the conventional case using an example.

Figure 12:
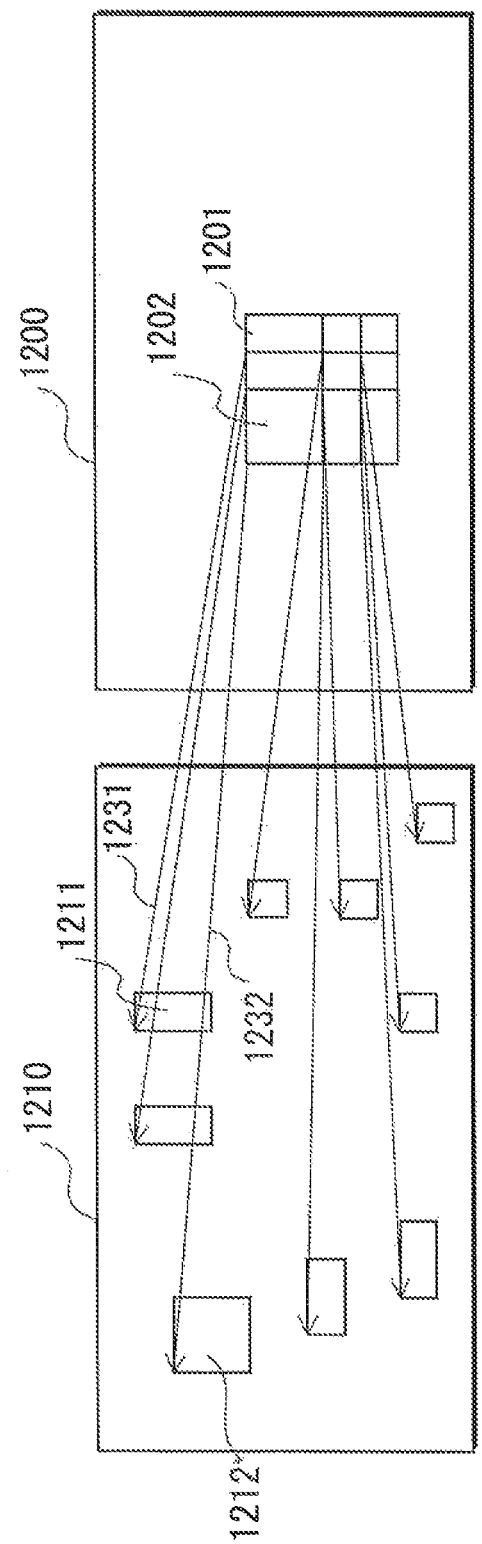
FIG. 12 shows correspondences between macroblocks of a frame that is to be decoded and regions of a reference frame in the prior art.

FIG. 12 shows correspondences between a source frame 1200 and a reference frame 1210 when motion compensation is executed in accordance with conventional methods. The region of the reference for the motion compensation block 1201 is reference block 1211, and the corresponding motion vector is a motion vector 1211. Further, the region of the reference frame for the motion compensation block 1202 is the frame block 1212, and the corresponding motion vector is a motion vector 1212.

According to conventional methods, the motion compensation block 1201 is decoded using a motion compensation operation executed by a motion compensation program designed for 4×8 pixel blocks. Further, when the motion compensation operation is executed on the motion compensation block 1202, a motion compensation program designed for 8×8 pixel blocks is executed to perform the motion compensation processing.

Figure 13:
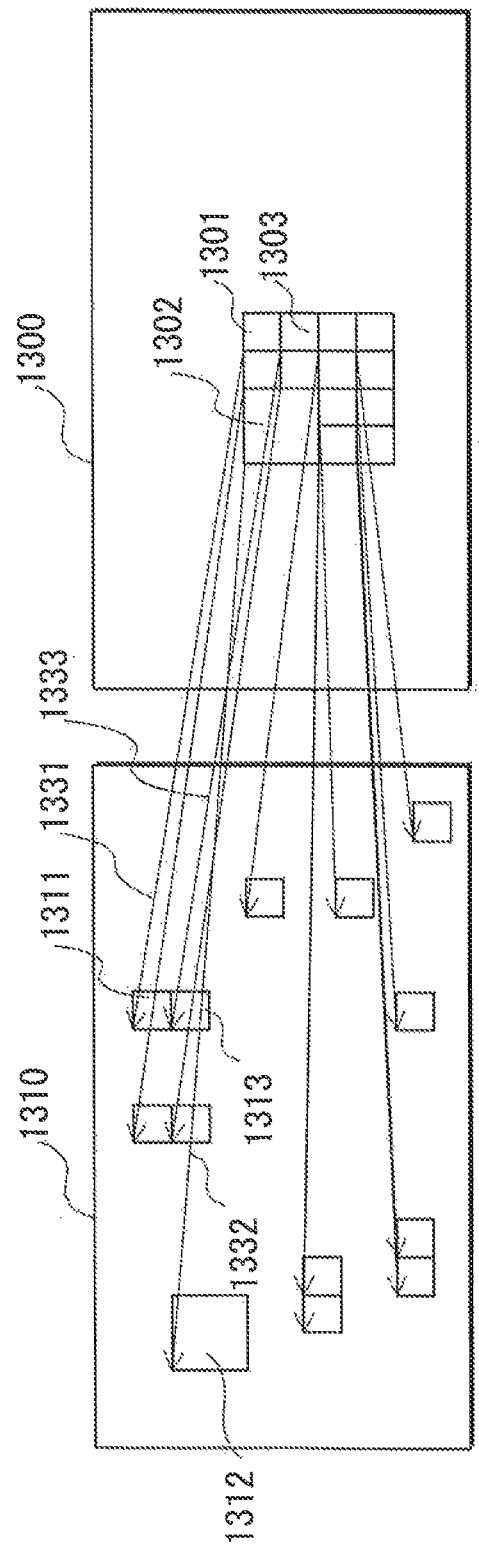
FIG. 13 shows correspondences between macroblocks of a frame that is to be decoded and regions of a reference frame in the second embodiment.

The method of the present embodiment, on the other hand, results in an arrangement like the one shown in FIG. 13. FIG. 13 shows the motion compensation blocks 1301 to 1303 and the corresponding reference frame regions 1311 to 1313 together with the motion vectors 1311 to 1313 in the source frame 1300 and the reference frame 1310. As shown in FIG. 13, the motion compensation block 1302 is not split as it would be according to the first embodiment. Rather, motion compensation is performed on the motion compensation block 1302 by executing the motion compensation program for use on 8×8 pixel blocks.

The motion compensation block 1201, meanwhile, is split into the motion compensation blocks 1301 and 1303, and the respective motion compensation operations are executed by the 4×4 pixel motion compensation operation unit 1055.

Third Embodiment

The third embodiment of the present invention differs from the first embodiment in that pixel data for the reference frame region which is the object of the motion vector is moved from the frame memory to a local memory prior to motion compensation.

This has the advantageous effect of increasing processing speed because, rather than having to acquire the reference pixel data from the frame memory upon every 4×4 pixel motion compensation operation, the DMA unit acquires the reference pixel data from the local memory which can be searched more easily.

Construction

Figure 14:
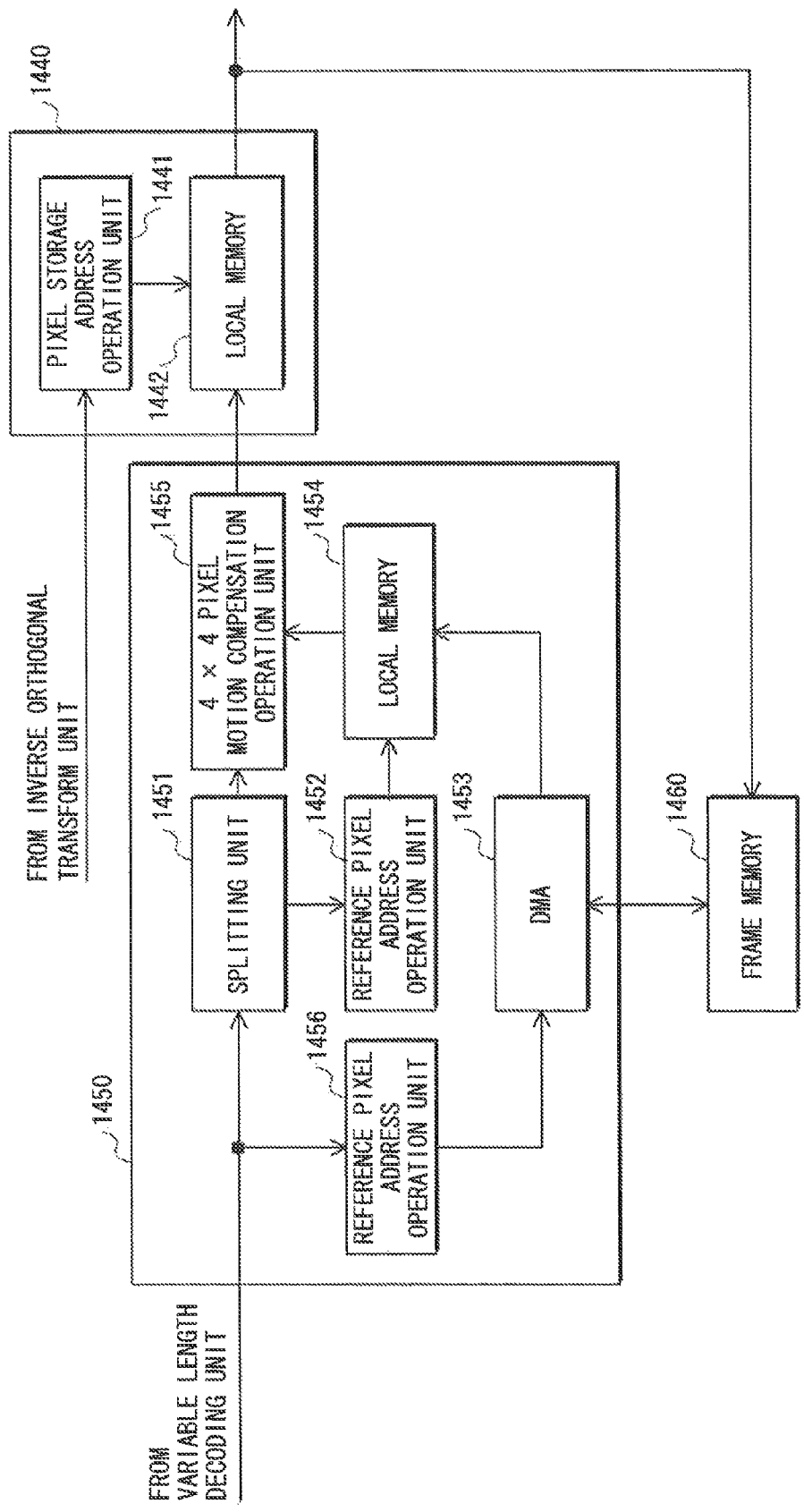
FIG. 14 is a block diagram showing a functional composition of a motion compensation unit of a video decoding device of a third embodiment.

As shown in FIG. 14, the third embodiment differs from the first and second embodiments in the inclusion of two reference pixel address operation units.

The reference pixel address operation unit 1452 functions similarly to the reference pixel address operation unit 152 of the first embodiment and the reference pixel address operation unit 1052 of the second embodiment. The reference pixel address operation unit 1452 further includes functions to specify reference pixel addresses in the local memory 1454 and cause the local memory 1454 to output the pixel data held at the specified addresses.

The video decoding device of the third embodiment further includes a reference pixel address operation unit 1456. The reference pixel address operation unit 1456 acquires in advance a region of the reference frame corresponding to the entire macroblock that is the object of the motion compensation operation rather than individual regions of a reference frame corresponding to minimum blocks.

Operation

In the third embodiment, the timing for acquiring the regions of the reference frame differs slightly from the other embodiments. The following describes the video decoding device of the third embodiment with reference to the flow-chart of FIG. 15. The description focuses on the motion compensation unit 1450.

Figure 15:
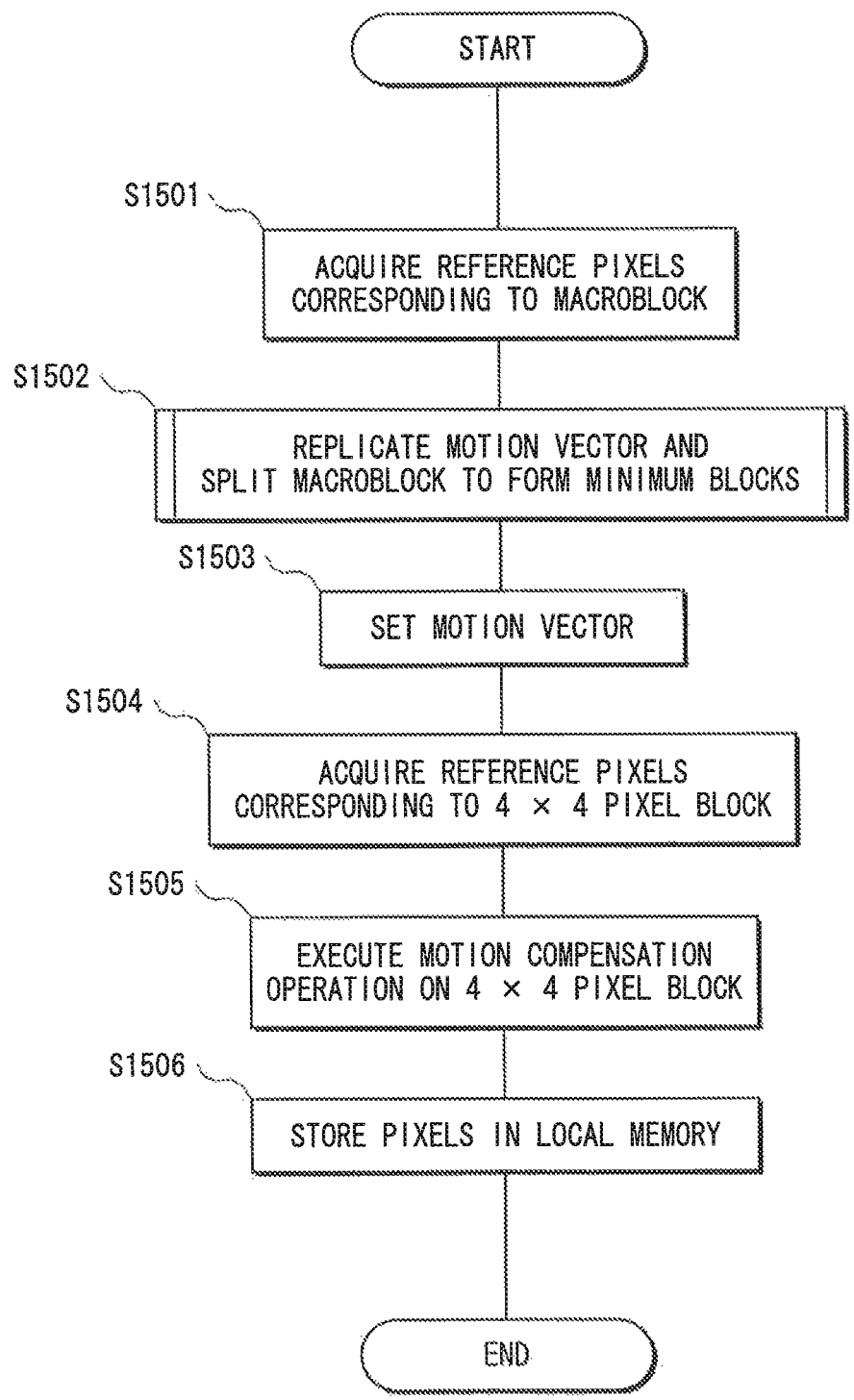
FIG. 15 is a flow chart showing operations of motion compensation in the video decoding device of the third embodiment.

As shown in the flow-chart of FIG. 15, on receipt of the macroblock data and the motion vector data transmitted from the variable length decoding unit, the reference pixel address operation unit 1456 first calculates the addresses for storing the pixel data of the region of the reference frame required for the motion compensation on the macroblock. The reference pixel address operation unit 1456 then outputs the calculated addresses to a DMA unit 1453. The DMA unit 1453 reads the data at the calculated addresses from the frame memory 1460, and stores the read data in a local memory 1454 (Step S1501).

The data stored in the local memory 1454 differs from that of the first embodiment in being pixel data for the region of the reference frame for the macroblock rather than the regions of the reference frame for the minimum block.

Next, a splitting unit 1451 generates 4×4 pixel minimum blocks by splitting the macroblock data transmitted from the variable length decoding unit (Step 1502). A description of the splitting method is omitted since the splitting method is similar to that of the first embodiment.

The splitting unit 1451 then transmits to the 4×4 pixel motion compensation operation unit 1455 the motion vectors and the coordinates of the top left pixel of the minimum block that is the object of the motion compensation operation (Step S1503).

The splitting unit 1451 also transmits the top left pixel of the minimum block and the motion vector to the reference pixel address operation unit 1452. Based on the transmitted information, the reference pixel address operation unit 1452 then calculates addresses in the local memory 1454 where the reference pixels are stored. The reference pixel address operation unit 1452 causes the local memory 1454 to output the data at the calculated addresses. The data outputted by the local memory 1454 is transmitted to the 4×4 pixel motion compensation operation unit 1455 (Step S1504).

The 4×4 pixel motion compensation operation unit 1455 decodes pixel values for the minimum block that is the object of the motion compensation operation based on the received motion vectors and the pixel values of the corresponding region of the reference frame (Step 1505).

The 4×4 pixel motion compensation operation unit 1455 stores the calculated pixel values in the local memory 1442. The decoded frame block corresponding to the macroblock is obtained by repeating Step S1503 to S1506 as many times as there are minimum blocks.

Notes

The video decoding device of the present invention has been described based on the above embodiments. However, the present invention is not limited to these embodiments.

The following describes exemplary modifications of the present invention.

(1) In the above embodiments, a device is disclosed for decoding data that has been compressed using the MPEG-4AVC standard. However the present invention is not limited to the MPEG-4AVC standard, and may also be applied to video data that has been compressed using the MPEG 2 standard or on any standard that includes a plurality of macroblock types.

(2) The present invention may be embodied as decoding methods for use by the decoding device of the above embodiment, or the computer program for causing a computer to execute the processing procedures of these methods.

The computer program may be recorded in a computer readable recording medium, typical examples of which are FD (Flexible Disk) CD (Compact Disc), DVD (Digital Versatile Disk), BD (Blu-ray Disc) and MO (Magneto Optical-Disc).

(3) In the above embodiments, for the sake of simplicity it is stated that the motion vector is duplicated. However, it is not necessary to duplicate the motion vector. The same motion vector may be used repeatedly.

(4) In the above embodiments the functional units may be realized by one or more LSI (Large Scale Integration) or VLSI (Very Large Scale Integration) devices. Alternatively, a single LSI device may be capable of executing the functions of a plurality of the functional units.

(5) In the above embodiments, it is described that a previous frame is used as the reference frame. However, frames from the future part of the time axis may also be used. In such cases the reference frame must be decoded prior to the motion compensation operation.

Moreover frames from both the past and the future may be used in order to decode a single frame. In such cases the information obtained by the splitting unit includes information as to whether the reference is bidirectional. When the reference is bidirectional two picture indices and two motion vectors are required. Bidirectional reference is a conventionally applied technique.

Industrial Applicability

The video decoding device of the present invention can be applied as a device to decode a video stream that has been compressed in accordance with the MPEG-4 AVC standard or MPEG 2 standard.

What is claimed is:

1. A video decoding device for decoding encoded data including a plurality of motion compensation blocks, each of the motion compensation blocks having been encoded by motion compensation, the video decoding device comprising:
   a frame memory that stores decoded frame data;
   a local memory that stores a reference pixel to be used in decoding a motion compensation block;
   an input unit that inputs a reference pixel from the frame memory to the local memory;
   an output unit that outputs a reference pixel stored in the local memory; and
   a motion compensation unit that performs motion compensation with respect to the reference pixel output from the local memory by the output unit, wherein
   a size of the reference pixel output from the local memory by the output unit is smaller than a size of the reference pixel input to the local memory by the input unit,
   the motion compensation block includes a plurality of sub-blocks,
   the output unit, for each of the sub-blocks, outputs a reference pixel required for performing motion compensation at a decimal pixel precision with respect to said each of the sub-blocks, and
   the motion compensation unit performs motion compensation with respect to said each of the sub-blocks by using a motion vector of the motion compensation block.

2. A video decoding method used by a video decoding device that decodes encoded data including a plurality of motion compensation blocks and has a frame memory that stores decoded frame data and a local memory that stores a reference pixel to be used in decoding a motion compensation block, each of the motion compensation blocks having been encoded by motion compensation, the video decoding method comprising:
   inputting a reference pixel to the local memory from the frame memory;
   outputting a reference pixel stored in the local memory; and
   performing motion compensation with respect to the reference pixel output from the local memory in the outputting, wherein
   a size of the reference pixel output from the local memory in the outputting is smaller than a size of the reference pixel input to the local memory in the inputting,
   the main compensation block includes a plurality of sub-blocks,
   in the outputting, for each of the sub-blocks, a reference pixel required for performing motion compensation at a decimal pixel precision with respect to said each of the sub-blocks is output, and
   in the motion compensation, motion compensation is performed with respect to said each of the sub-blocks by using a motion vector of the motion compensation block.

3. The video decoding device of claim 1, wherein
a horizontal-direction size of said each of the sub-blocks is smaller than a horizontal-direction size of the motion compensation block.

4. The video decoding device of claim 1, wherein
a vertical-direction size of said each of the sub-blocks is smaller than a vertical-direction size of the motion compensation block.

5. The video decoding device of claim 1, wherein
a horizontal-direction size of said each of the sub-blocks is smaller than a horizontal-direction size of the motion compensation block, and
a vertical-direction size of said each of the sub-blocks is smaller than a vertical-direction size of the motion compensation block.

6. The video decoding device of claim 2, wherein
a horizontal-direction size of said each of the sub-blocks is smaller than a horizontal-direction size of the motion compensation block.

7. The video decoding device of claim 2, wherein
a vertical-direction size of said each of the sub-blocks is smaller than a vertical-direction size of the motion compensation block.

8. The video decoding device of claim 2, wherein
a horizontal-direction size of said each of the sub-blocks is smaller than a horizontal-direction size of the motion compensation block, and
a vertical-direction size of said each of the sub-blocks is smaller than a vertical-direction size of the motion compensation block.

* * * * *